United States Patent [19]

Sayre

[11] 4,102,739
[45] Jul. 25, 1978

[54] METHOD OF SHIELDING A LIQUID-METAL-COOLED REACTOR

[75] Inventor: Robert K. Sayre, Mt. Lebanon, Pa.

[73] Assignee: The United States of America as represented by the United States Department of Energy, Washington, D.C.

[21] Appl. No.: 728,359

[22] Filed: Sep. 30, 1976

[51] Int. Cl.² ............................................... G21C 9/00
[52] U.S. Cl. ........................................ 176/38; 176/40; 176/87; 176/DIG. 2
[58] Field of Search ...................... 176/37, 38, 40, 45, 176/65, 87; 165/135, 136

[56] References Cited

U.S. PATENT DOCUMENTS

| | | | |
|---|---|---|---|
| 2,215,532 | 9/1940 | Richardson | 176/87 |
| 3,231,339 | 1/1966 | Merthy et al. | 165/136 |
| 3,275,523 | 9/1966 | Campbell, Jr. et al. | 176/87 |
| 3,320,969 | 5/1967 | Gordon | 176/37 |
| 3,548,931 | 12/1970 | Germer et al. | 176/87 |
| 3,702,802 | 11/1972 | Jansen, Jr. | 176/38 |
| 3,749,962 | 7/1973 | Smith et al. | 165/135 |
| 3,990,941 | 7/1974 | Scholz | 176/87 |

Primary Examiner—Samuel W. Engle
Assistant Examiner—Ralph Palo
Attorney, Agent, or Firm—Dean E. Carlson; Frank H. Jackson

[57] ABSTRACT

The primary heat transport system of a nuclear reactor — particularly for a liquid-metal-cooled fast-breeder reactor — is shielded and protected from leakage by establishing and maintaining a bed of a powdered oxide closely and completely surrounding all components thereof by passing a gas upwardly therethrough at such a rate as to slightly expand the bed to the extent that the components of the system are able to expand without damage and yet the particles of the bed remain close enough so that the bed acts as a guard vessel for the system. Preferably the gas contains 1 to 10% oxygen and the gas is passed upwardly through the bed at such a rate that the lower portion of the bed is a fixed bed while the upper portion is a fluidized bed, the line of demarcation therebetween being high enough that the fixed bed portion of the bed serves as guard vessel for the system.

7 Claims, 5 Drawing Figures

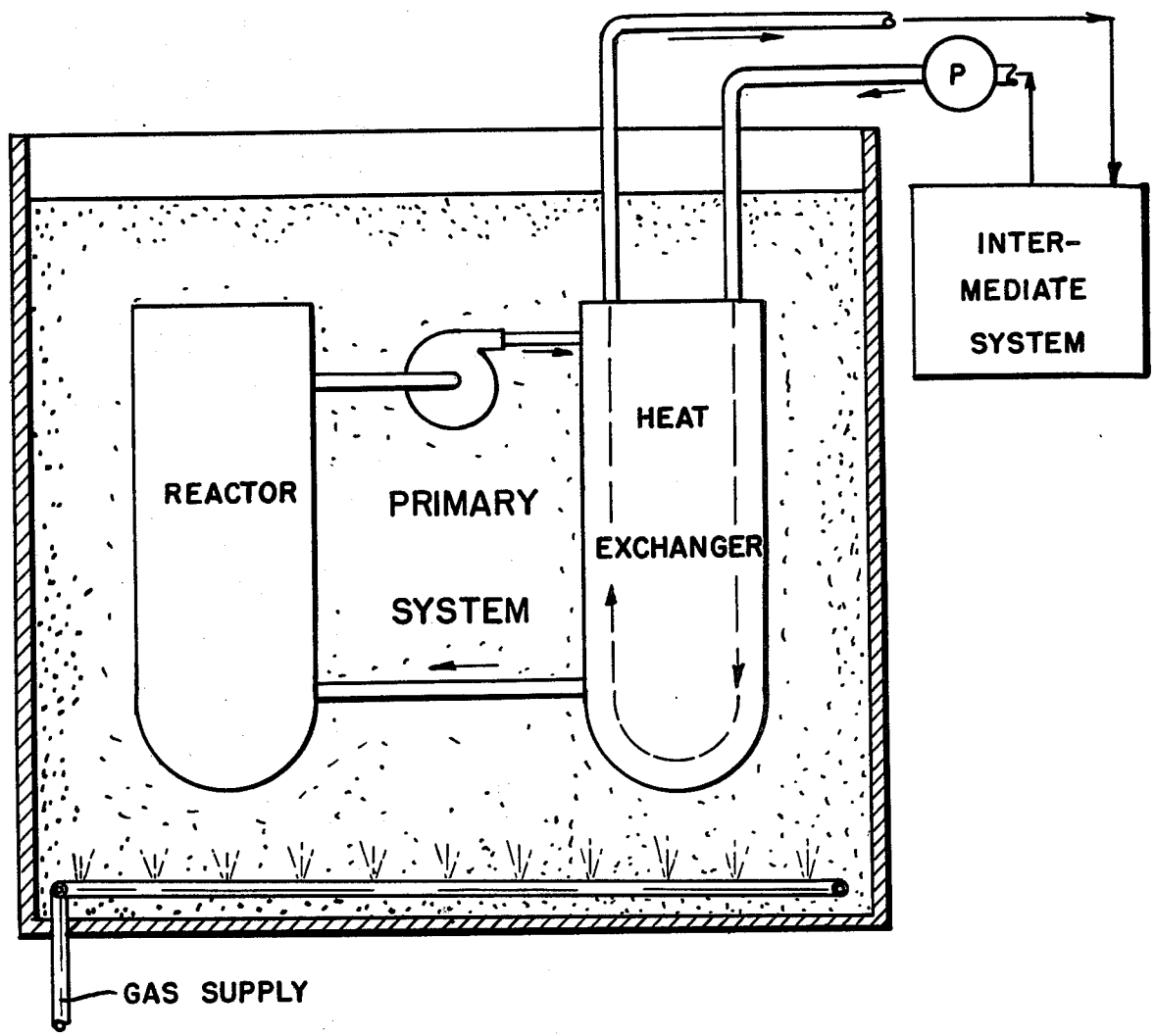

4,102,739

METHOD OF SHIELDING A LIQUID-METAL-COOLED REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method of shielding a nuclear reactor. In more detail the invention relates to a method of shielding a liquid-metal-cooled fast-breeder reactor wherein the shield also serves as a guard vessel.

Conventionally, a massive concrete shield is provided surrounding a nuclear reactor to prevent radiation from reaching the surroundings. The cost of such a shield is an appreciable fraction of the cost of the entire facility. Fast breeder reactors currently being planned and constructed are of such large size that the shielding therefor will cost many millions of dollars. The large amount of shield concrete required also hampers installation of the various components of the reactor plant and necessitates careful control of delivery and installation dates of reactor components.

In addition, to ensure that the reactor core is always covered with sodium for emergency core cooling, fast breeder reactors as presently designed include guard vessels surrounding the several components of the primary heat transport system of the reactor plant; that is, reactor, primary pumps, and intermediate heat exchangers. The present philosphy of design of these guard vessels requires that all major components be supported from above. This fact greatly complicates the design problem raised by the necessity of ensuring that earthquakes will not rupture the containment. Accordingly, consideration of alternate approaches is desirable. It must be understood that a substantial design and testing effort would be necessary before the method of this invention could actually be employed to shield a large nuclear reactor.

SUMMARY OF THE INVENTION

According to the present invention shielding and leak containment for the primary heat transport system of a nuclear reactor — particularly a liquid-metal-cooled nuclear reactor — is obtained by establishing and maintaining a bed of powdered oxide particles in a slightly expanded state surrounding all components of the system by passing a gas upwardly therethrough. The bed of particles is expanded sufficiently to allow for component and pipe expansion but the particles are still close enough together that the bed serves as a guard vessel for the system. Thus the gas flow serves to partially counterbalance the packing effect of gravity, reducing the friction in the bed so that the vessels and piping can expand thermally, but yet the bed is sufficiently stiff to resist the intrusion of sodium from a leak or rupture in the system. Preferably the gas includes 1 to 10% oxygen and the bed pressure is slightly less than the liquid-metal pressure in the reactor cooling system.

BRIEF DESCRIPTION OF THE DRAWINGS

The single FIGURE of the drawing is a schematic diagram of the primary heat transpart system of a Nuclear Reactor illustrating the method of the present invention.

DESCRIPTION OF THE INVENTION

It will be appreciated that shielding of any kind of reactor — water-, gas- or liquid-metal cooled — can be accomplished by the method of the present invention but the invention will be described herein specifically with respect to the shielding of a sodium-cooled fast-breeder reactor because the invention has advantages with respect to such a reactor it does not have with respect to water-cooled and gas-cooled reactors. To practice the present invention the components of a sodium-cooled fast breeder included in the Primary Heat Transport System thereof — the reactor, the primary pumps and the intermediate heat exchangers — are assembled bare without a shield or guard vessels and buried under powdered magnesium oxide (MgO). During operation of the reactor the bed of magnesium oxide is expanded by gas jets located below the bed to an extent just sufficient to provide sufficient fluidity in the bed to permit expansion of the components and movement of the piping connecting the components and to cool the bed while the bed particles are still close enough together that the bed serves as a guard vessel by stopping coolant leaks from the primary heat transport system of the reactor. To ensure that flow would be outwardly from the heat transport system rather than inwardly should a leak occur, the bed pressure is slightly less than the coolant pressure with the pumps at pony motor speed. This assumes that, in accordance with accepted practice, the circulating pumps are reduced to pony motor speed, as soon as a leak is discovered. Bed pressure can be adjusted to the desired figure by employing MgO particles of the appropriate density. MgO powder is available commercially having the material density adjusted by burning techniques to any desired value between 10 and 150 pounds per cubic foot.

The preferred gas is nitrogen with helium an alternate. While helium may require less pumping power, nitrogen is less costly. Preferably a limited supply of oxygen is included in the gas percolating up through the MgO powder to react with a sodium leak to provide a means of raising the melting point of sodium to help stop the leak. The amount of oxygen to use will range between 1 and 10%.

MgO is the preferred oxide for use in the shield. Alumina could be used but is more costly. CaO is not acceptable since it reacts with water vapor at low temperatures. Particle diameter should be between 0.001 inch and 0.005 inch and the diameter of the interstices between particles should be 0.005 inch or less.

It can be shown that a bed of unwetted powder oxide will support a column of liquid sodium about 38 feet high if the interstices between the particles is 0.005 inch or less. In other words a bed of a powdered oxide will act similarly to a sand mold for a casting and support a liquid metal. Sand can be used as a mold for casting a liquid metal because the metal does not penetrate the sand because it does not wet it and the pores are fine enough so that the meniscus at each pore supports the liquid metal column at that point. MgO behaves similarly, when not wetted by sodium. The presence of the oxygen with the nitrogen gas serves to oxidize the sodium surface and a sodium leak and the oxidation will inhibit any tendency of the sodium to wet the MgO.

To ensure that the bed has sufficient fluidity to permit expansion of the components therein, the bed may be operated under condition whereby the lower portion of the bed is static except near the gas jets while the upper portion is fluidized. The gas pressure is adjusted so that the line of demarcation between the two layers is above the desired minimum level of sodium since it is only the static portion of the bed which will be effective to retain sodium. It should be noted that the proposed bed depth is 60 feet. Thus, there will be a substantial pressure difference between top and bottom of the bed which pressure difference is responsible for this phenomenon.

The partially fluidized bed provides shielding for the reactor and other components of the primary heat transport system. In addition the static portion of the bed serves as a guard vessel. The partially fluidized bed also provides thermal insulation, earthquake damping, fire prevention, and filtering of radioactive particulates.

It should be noted that an auxiliary source of power is necessary since consequences of a complete interruption of power could be severe.

A reactor plant to which this invention has particular application is a power reactor such as the Clinch River Fast Breeder Reactor now scheduled for construction in Tennessee. This reactor is described in general terms in PMC-74-01 (CONF-740116) available from the U.S. Energy Research and Development Administration Technical Information Center, Box 62, Oak Ridge, Tenn. 37830. The shielding discussed herein would be employed within the reactor containment building of the Clinch River Plant were this invention to be applied to that Plant.

As has been stated it is preferred that the fluidizing gas contain oxygen since this oxygen will slowly react with and oxidize the surface layer of sodium leaking from the reactor, raising the freezing point and causing the surface to harden thus controlling and containing the leak. It is also clear that the fluidized bed would produce a smothering action limiting the oxidation rate so that a sodium fire would not occur. Some oxidation of the sodium will also prevent or reduce wetting of the oxide powder by the sodium. The net result of all this is that even without guard vessels a sodium leak from any portion of the plant would be much better contained than with guard vessels or other double containment system. Furthermore, there is no possibility of an uncontrolled sodium leak as there is no place for the sodium to go.

The fluidized bed should have at least the following characteristics:

1. The pressure at the bottom of the bed should be low enough so that, should a leak occur, sodium will flow outward rather than gas bubble or powder flow into the reactor coolant system, especially into the reactor inlet plenum.

2. The mass velocity required to partially fluidize the bed should not be so high as to require excessive pumping power.

3. The bed particles should be small enough and packed tightly enough so that any leak would be controlled by the negative miniscus effect (the sodium not wetting the oxide).

Specific parameters for one reactor shielded by the method of the present invention follow:

| | |
|---|---|
| Containment structure | 150' diameter |
| Proportion of containment structure occupied by fluidized bed shield | ⅓ |
| Bed material | MgO |
| Size of bed material | .001" |
| Bed density | 40.5#/ft³ |
| Bed depth | 60 feet |
| Fluidizing gas | Nitrogen |
| Pressure at the bottom of the bed | 17.0 psig |
| Minimum fluidization mass velocity | 1.84#/hr ft² |
| Pumping power | 300 HP |
| Am't. of MgO required | 33,150 Tons |
| Cost of MgO | $4,200,000 |

The following discussion will explain how some of the above parameters are obtained.

Suppose we have a reactor vessel which is 50 feet high filled with sodium at a density of 54 /ft.³ Then the static pressure at the bottom of the reactor vessel will be equal to cover gas pressure plus the hydrostatic pressure of the sodium.

50 × 54/144 + cover gas pressure or
18.75 psi + cover gas pressure

For simplicity we will assume that the cover gas pressure is zero. This is a realistic assumption since operation of LMFBR reactors with cover gas at atmospheric pressure — zero guage — is reasonable. Now, if we say that the gas pressure at the bottom of the bed and likewise the static pressure of the granular particles at the bottom of the bed should not exceed, say, 90% of the sodium pressure, then the allowable pressure, gas and/or particles, would be 0.9 × 18.75 = 16.875 psi. Now, if we assume the bed to be 60 ft. deep, (the extra 10 ft. for shielding), then we can calculate the maximum allowable bed density which will meet the 16.875 psi pressure.

Letting D = bed density
60 D/144 = 16.875
D = 40.5 #/ft.³

If a bed of a density of 40.5 #/ ft.³ 60 feet deep were created and subjected to a gas pressure of 16.875 psi differential between the bottom and top of the bed, and the gas pressure drop were linear between the bottom and the top of the bed, gravity would be neutralized and the bed would be in a state of incipient fluidization or levitation.

Actually, however, the gas pressure drop through the bed would not be linear, but would be less toward the bottom of the bed and greater towards the top of the bed, due to variation in the density of the gas through the bed due to the gas compressibility. The net result would be that the lower part of the bed would be static except near the gas jets while the upper part would be fluidized, with a line of demarcation somewhere between.

There are many advantages attained by the practice of the present invention some of which have already been discussed. Others include 1. Construction costs and time of construction are greatly reduced as the amount of concrete needed is greatly reduced and the impediment to construction arising from the use of concrete for shielding is eliminated.

2. The components of the plant can be supported from below without loss of leak containment. Mounting the vessels from below rather than from above as in accordance with present practice should result in greatly reduced earthquake acceleration.

3. Tremendous damping will result from embedding the plant in an oxide powder. This damping should completely eliminate any need for earthquake snubbers and completely dampen the response of the plant to earthquakes.

4. Accessibility of the plant is greatly increased. For maintenance, several approaches could be used.

(a) Items which surely require maintenance are not embedded in powder but rather are installed in rooms that are themselves embedded in powder with an access tunnel to the the room.

(b) The plant may be divided into compartments each of which is normally filled with oxide powder and separately fluidized and capable of being emptied or having the powder level therein lowered.

(c) A small submersible vehicle equipped with manipulators and preferably equipped with gas jets capable of fluidizing the powder surrounding it might be operated in the oxide bed for maintenance.

5 The use of a powder as shielding material lends itself to employment of a coordinate system of leak detection wherein a sodium leak would ground a specific pair of wires located in the fluidized bed giving the coordinates of the leak location and the numbers of pairs of wires grounded would give the size of the leak.

6. It would not be necessary to inert any part of the containment structure as the bed would eliminate any possibility of a sodium fire.

7. If any gas escapes from the reactor as a result of a leak into the bed, the bed will act as a fine deep filter to remove any radioactive particulates. Also, the extreme amount of surface are present in the bed should give it excellent absorptive characteristics, holding any rare radioactive gases.

The embodiments of the invention in which an exclusive property or privilege is claimed are defined as follows:

1. A method of shielding the primary heat transport system of a sodium cooled nuclear reactor comprising establishing and maintaining a bed of powdered oxide particles closely and completely surrounding said system by passing a gas upwardly through the bed at a rate effective to slightly expand the bed whereby components of the system are able to expand without damage to themselves while the bed particles remain close enough so that the bed also serves as a guard vessel for the system, and maintaining the the depth of the powdered oxide at a level such that the bed also serves as a biological shield for the system.

2. A method according to claim 1 wherein the powdered oxide is MgO.

3. A method according to claim 2 wherein the bed density and gas pressure are such that the pressure in the bed is less than the sodium pressure in the heat transport system at pony motor speed.

4. A method according to claim 3 wherein the gas is nitrogen or helium.

5. A method according to claim 4 wherein the gas is passed upwardly through the bed at a rate such that the lower portion of the bed is a fixed bed in a slightly expanded state and the upper portion of the bed is a fluidized bed, the line of demarcation therebetween being high enough that the fixed portion of the bed serves as a guard vessel.

6. A method according to claim 4 wherein the gas contains 1 – 10% by volume oxygen.

7. A method according to claim 6 wherein the MgO particles are 0.001 inch to 0.005 inch in diameter, the interstices diameter in the bed is about 0.005 inch and the bed density is about 40.5 pounds per cubic feet.

* * * * *